United States Patent
Keller, Jr.

(10) Patent No.: US 8,207,818 B2
(45) Date of Patent: Jun. 26, 2012

(54) METHOD AND APPARATUS REGARDING A MOVABLE BARRIER OPERATOR REMOTE CONTROL TRANSMITTER KIT

(75) Inventor: Robert Roy Keller, Jr., Park Ridge, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1388 days.

(21) Appl. No.: 11/760,538

(22) Filed: Jun. 8, 2007

(65) Prior Publication Data

US 2008/0303706 A1    Dec. 11, 2008

(51) Int. Cl.
*H03M 5/14* (2006.01)
(52) U.S. Cl. ............. 340/5.71; 340/12.24; 340/12.28; 340/13.24; 341/173
(58) Field of Classification Search .............. 340/5.2, 340/5.22, 5.26, 5.64, 5.71, 825.69, 825.72, 340/12.22, 12.23, 12.28, 12.29; 455/418, 455/419; 341/173
See application file for complete search history.

(56) References Cited

U.S. PATENT DOCUMENTS

| | | | |
|---|---|---|---|
| 5,614,906 A | 3/1997 | Hayes et al. | |
| 5,680,134 A | 10/1997 | Tsui | |
| 6,486,795 B1 | 11/2002 | Sobel et al. | |
| 7,039,397 B2 | 5/2006 | Chuey | |
| 7,084,781 B2 | 8/2006 | Chuey | |
| 2004/0207537 A1 | 10/2004 | Keller, Jr. et al. | |
| 2005/0024230 A1 | 2/2005 | Chuey | |
| 2007/0190993 A1* | 8/2007 | Chuey et al. | 455/418 |
| 2008/0088748 A1* | 4/2008 | Lim | 348/734 |

OTHER PUBLICATIONS

Universal Garage Door Remote Control (Model G5V), Skylink Group, 2005.*
British Search Report for GB0809668.7 Dated Aug. 11, 2008.

* cited by examiner

*Primary Examiner* — Nabil Syed
(74) *Attorney, Agent, or Firm* — Fitch Even Tabin & Flannery LLP

(57) ABSTRACT

A movable barrier operator remote control transmitter kit comprises a transmitter (200) and, if desired, a user discernable listing (402) of a plurality of different remote control signal instruction protocols. This transmitter can be configured and arranged to automatically incrementally configure the transmitter using a series of protocols with each assertion of a user input (203) and also to cause the test configured transmitter to transmit a test transmission (701) to permit the user to ascertain whether a corresponding movable barrier operator responds positively. This listing can present the protocols in an order that matches a sequential order (401) by which the transmitter controller (201) will incrementally configure and test the transmitter. User discernable instructions (601) can provide advice to a user with respect to using the list (402) to quickly advance through the listing (401 to begin the compatibly testing with a particular selected candidate protocol.

30 Claims, 3 Drawing Sheets

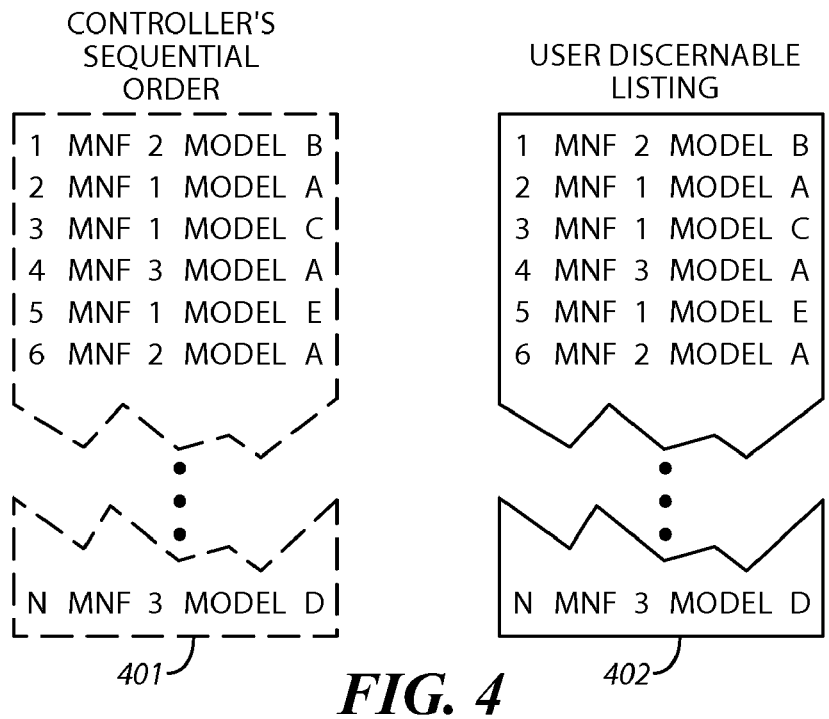
FIG. 4
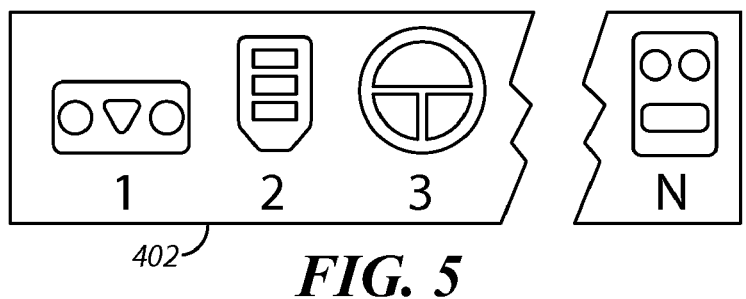
FIG. 5
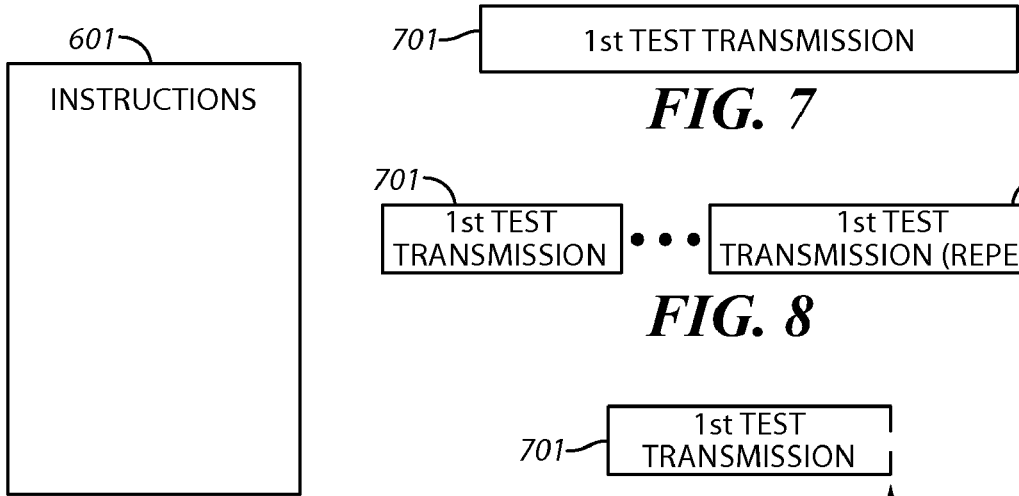
FIG. 6
FIG. 7
FIG. 8
FIG. 9

METHOD AND APPARATUS REGARDING A MOVABLE BARRIER OPERATOR REMOTE CONTROL TRANSMITTER KIT

TECHNICAL FIELD

This invention relates generally to movable barrier operator remote control transmitters and more particularly to so-called universal transmitters capable of operating compatibly with a plurality of different movable barrier operators.

BACKGROUND

Movable barrier operators of various kinds are known in the art and include operators that effect the selective control and movement of single panel and segmented garage doors, pivoting, rolling, and swinging gates, guard arms, rolling shutters, and various other movable barriers. Many such movable barrier operators are configured and arranged to operate in conjunction with a movable barrier operator remote control transmitter that can send a code comprising a remote control instruction to the movable barrier operator to thereby cause the latter to effect a desired movement or other action with respect to, for example, a corresponding movable barrier.

In practice, such movable barrier operators do not all utilize a same remote control instruction signal protocol. Variations exist, for example, with respect to one or more of a transmission center frequency and/or channel width, modulation type, synchronization, handshake, and/or heartbeat requirements, data format, encoding, or the like, and encryption (including, but not limited to, the use or non-use of rolling codes), to note but a few. As a result, a so-called universal transmitter intended to operate compatibly with a variety of different movable barrier operators must also be sufficiently functionally agile to permit dynamic configuration in a manner that will accommodate such variations.

Some practitioners in this regard suggest that such a movable barrier operator remote control transmitter be pre-provisioned with all anticipated and potentially required remote control instruction signal protocols. As many such movable barrier operator remote control transmitter tend to have a very simple and limited user interface (comprising, for example, only three simple pushbuttons with no display other than perhaps one or two light emitting diodes or even only a single pushbutton with no display whatsoever), it has been viewed as important to facilitate the ability of a user to suitably access such protocols when and as needed in as simple and as user-transparent a manner as possible.

To meet such a need, by one approach, a user places such a movable barrier operator remote control transmitter into a learning mode of operation. During this learning mode of operation, the movable barrier operator remote control transmitter then self-increments through test transmissions of a series of different pre-provisioned remote control signal protocols. When the movable barrier operator eventually displays a positive reaction to a given test transmission, the user halts the process and the movable barrier operator remote control transmitter thereafter knows to use that particular corresponding remote control signal protocol.

Though successful to a degree, such an approach nevertheless fails to constitute a wholly satisfactory solution for all application settings. As but one illustrative example in this regard, the number of different remote control signal protocols has grown as the number of different manufacturers (and their proliferating product lines) has grown. As a result, a modern transmitter of this type might presently be expected to accommodate ten, fifteen, or even more different remote control signal protocols with the potential for considerably more going forward being a very real possibility. Such numbers, however, can greatly increase the amount of time required by a self-iterating search such as that described above. This, in turn, can lead to user confusion and/or dissatisfaction.

Furthermore, in many cases, the movable barrier operator itself will only operate in a learning mode of operation for a relatively short period of time (such as, for example, thirty seconds). Present conditions and practices therefore raise the possibility of a movable barrier operator timing out and automatically leaving a learning mode of operation before a given transmitter has completely cycled through all candidate remote control instruction signal protocols. This, in turn, can lead to utterly frustrating an attempt to achieve compatible interaction between two such devices.

BRIEF DESCRIPTION OF THE DRAWINGS

The above needs are at least partially met through provision of the method and apparatus regarding a movable barrier operator remote control transmitter kit described in the following detailed description, particularly when studied in conjunction with the drawings, wherein:

FIG. 4 comprises a schematic depiction as configured in accordance with various embodiments of the invention;

FIG. 5 comprises a top plan schematic depiction as configured in accordance with various embodiments of the invention;

FIG. 6 comprises a top plan schematic depiction as configured in accordance with various embodiments of the invention;

FIG. 7 comprises a schematic depiction as configured in accordance with various embodiments of the invention;

FIG. 8 comprises a schematic depiction as configured in accordance with various embodiments of the invention; and FIG. 9 comprises a schematic depiction as configured in accordance with various embodiments of the invention.

Figure 1:
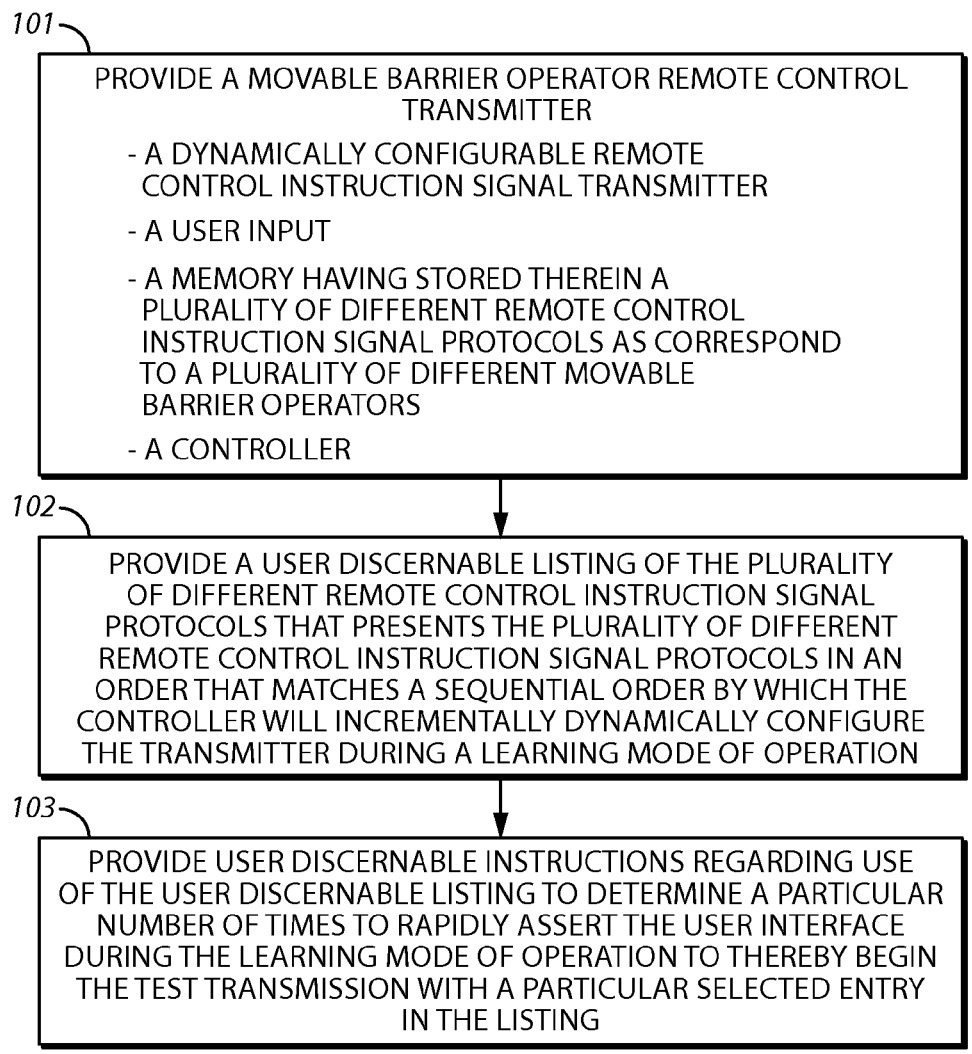
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

Detailed Description

Generally speaking, pursuant to these various embodiments, a movable barrier operator remote control transmitter kit (for use with a movable barrier operator that uses a particular remote control instruction signal protocol) comprises a movable barrier operator remote control transmitter and, if desired, a user discernable listing of a plurality of different remote control signal instructions. The former can comprise a dynamically configurable remote control instruction signal transmitter, a user input, a memory (having stored therein a plurality of different remote control instruction signal protocols as correspond to a plurality of different movable barrier operators), and a controller operably coupled to the foregoing.

This controller, in turn, can be configured and arranged to (during a user selectable learning mode of operation) automatically at least begin to incrementally dynamically configure the transmitter using a next one of the plurality of protocols with each appropriate user assertion of the user input to thereby provide a test configured transmitter and also to cause the test configured transmitter to transmit a test transmission to thereby permit the user to ascertain whether a corresponding movable barrier operator responds positively to the test configured transmitter. In such a case, the aforementioned user discernable listing can present the plurality of different remote control instruction signal protocols in an order that matches a sequential order by which the controller will incrementally dynamically configured the dynamically configurable remote control instruction signal transmitter during this learning mode of operation.

So configured and arranged, if desired, a user can rapidly assert the aforementioned user interface during this learning mode of operation a particular intended number of times to thereby intentionally and purposefully begin the test transmissions with a particular selected entry in that listing. These teachings will readily accommodate including, as a part of the aforementioned kit, user discernable instructions in this regard.

To further facilitate and aid such an approach, if desired, these teachings will also optionally accommodate configuring and arranging the controller so that the controller will automatically halt such a test transmission (during the learning mode of operation) upon detecting a subsequent user assertion of the user input prior to completion of that particular test transmission. By this approach, any test transmission that is begun in response to a user assertion of the user interface will be halted if and when the user quickly again asserts the user interface in order to select a particular starting point within the aforementioned listing.

As another aid in this regard, as used alone or in combination with the approach just mentioned, the sequence of remote control instruction signal protocols can be purposely arranged in order to tend to prompt a required reconfiguration of at least one radio frequency transmission parameter of the dynamically configurable remote control instruction signal transmitter to thereby tend to delay the corresponding test transmission and thereby provide temporal space during which the user can again increment through the protocol listing as per these teachings without a need to effect an actual test transmission of intervening protocols.

So configured, these teachings permit a platform having only a very limited user interface to nevertheless permit a user to easily and quickly skip through a number of candidate signal protocols in order to effectively begin the test transmissions of a learning mode of operation with a selected protocol. This, in turn, can contribute to greater user satisfaction, effectiveness, and even safety.

These and other benefits may become clearer upon making a thorough review and study of the following detailed description. Referring now to the drawings, and in particular to FIG. 1, an illustrative process 100 as corresponds with these teachings can be applied in use with a movable barrier operator that uses a particular remote control instruction signal protocol of choice. Those skilled in the art will recognize and understand that this can comprise any remote control instruction signal protocol as is presently known or likely any remote control instruction signal protocol as may be developed going forward.

Figure 2:
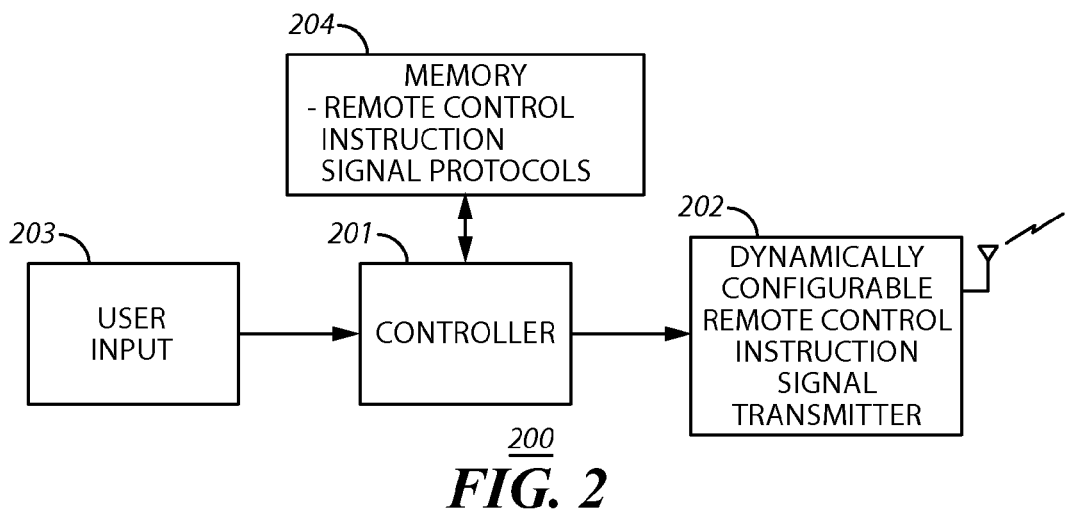
FIG. 2 comprises a block diagram as configured in accordance with various embodiments of the invention.

Referring as well to FIG. 2, this process 100 accommodates providing 101 a movable barrier operator remote control transmitter 200. This movable barrier operator remote control transmitter 200 can comprise, for example, a controller 201 that operably couples to a dynamically configurable remote control instruction signal transmitter 202, a user input 203, and a memory 204.

The dynamically configurable remote control instruction signal transmitter 202 can be configurable in any of a wide variety of ways as will be understood by those skilled in the art. This can include, but is not limited to, configuration flexibility with respect to a transmission frequency, modulation, data formatting, pilot signals, fixed and rolling codes, and so forth as all pertain to compatibly supporting a variety of different remote control instruction signal protocols. Such transmitters are known in the art and require no further detailed elaboration here.

The user input 203 can vary with the needs and/or opportunities as may attend a given application setting. Those skilled in the art will understand that this user input 203 can comprise any of a wide variety of input form factors including but not limited to real and virtual push buttons, sliders, cursor control mechanisms, or even a voice recognition-based capability. It will also be understood that this user input 203 can comprise any number of discrete input mechanisms (such as, to illustrate and without intending any limitations in this regard, a particular number of push buttons such as three push buttons).

The memory 204 can have stored therein a plurality of different remote control instruction signal protocols as correspond to a plurality of different movable barrier operators. These movable barrier operators can of course vary from one another by model (when offered by a single manufacturer) and/or by brand (when offered by differing manufacturers who compete with one another in the marketplace). The particular number of movable barrier operators so accommodated can vary as desired. As one illustrative example in this regard, this memory 204 can store such information for at least fifteen different movable barrier operators.

Figure 3A:
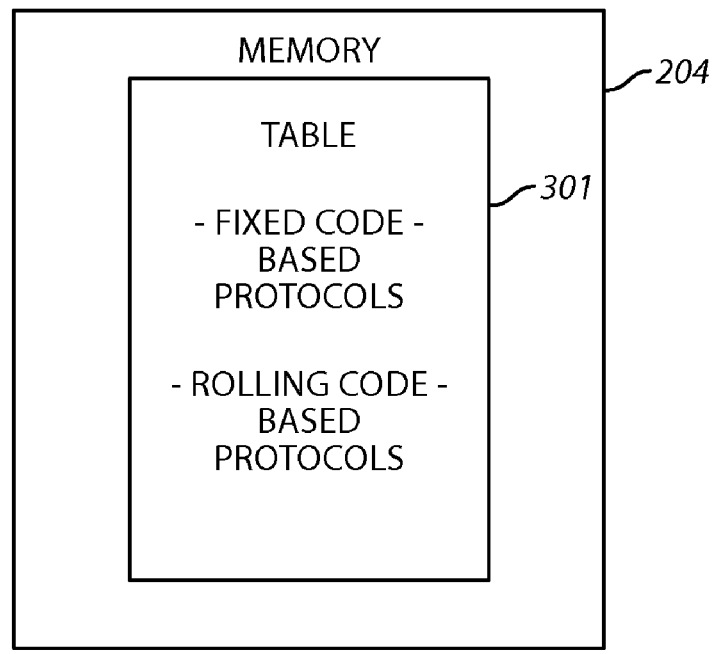
FIG. 3 comprises a schematic block diagram as configured in accordance with various embodiments of the invention.
Figure 3B:
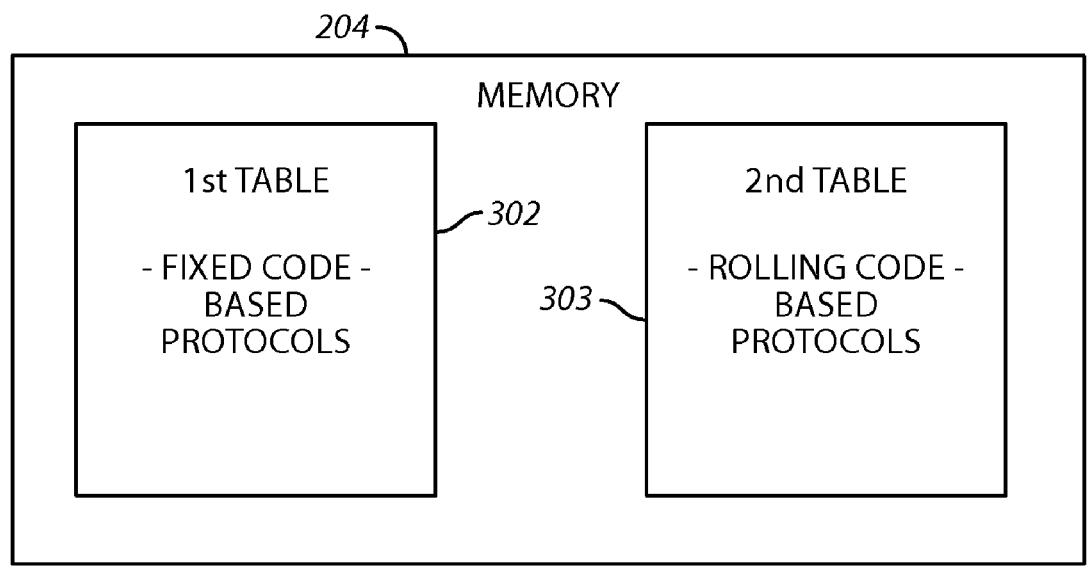

As both fixed code and rolling code-based protocols are known in the art, if desired, these stored protocols can comprise, at least in part, both fixed code and rolling code-based movable barrier operators. As one approach in this regard, and referring momentarily to FIG. 3A, a single table 301 can serve to store both fixed code-based protocols and rolling code-based protocols. Such a table 301 can be organized, if desired, to present these various protocols in an order that first presents protocols as correspond to movable barrier operators having the shortest learning modes of operation. Alternately, and as shown in FIG. 3B the fixed code-based protocols can be stored in a first table 302 while rolling code-based protocols are stored in a second table 303 that is logically discrete from the first table 302.

Returning to FIGS. 1 and 2, the controller 201 can comprise a dedicated purpose or a partially or wholly programmable platform as desired. This controller 201 can be configured and arranged (via, for example, programming as will be well understood by those skilled in the art) to effect a user selectable learning mode of operation by which the movable barrier operator remote control transmitter 200 can be compatibly mated with the aforementioned movable barrier operator. This learning mode of operation, in turn, can accommodate, by one approach, automatically at least beginning to incrementally dynamically configure the dynamically configurable remote control instruction signal transmitter 202 using a next one of the plurality of different remote control instruction signal protocols (as are stored in the memory 204) with each appropriate user assertion of the user input 203 to thereby provide a test configured transmitter. To illustrate, with one assertion of the user input 203 in this regard, the controller 201 will begin to configure the dynamically configurable remote control instruction signal transmitter 202 using a first remote control instruction signal protocol. With a second, subsequent assertion of the user input 203 in this regard, the controller 201 will then begin to configure the dynamically configurable remote control instruction signal transmitter 202 using a next remote control instruction signal protocol.

This learning mode of operation can also comprise causing the test configured transmitter to transmit a test transmission to thereby permit the user to ascertain whether a corresponding movable barrier operator responds positively to the test configured transmitter. Some more specific examples in this regard will be provided further below.

Referring now to both FIGS. 1 and 4, this process 100 will also accommodate providing 102 a user discernable listing 402 of the plurality of different remote control instruction signal protocols that are stored in the aforementioned memory 204. By one approach, this listing 402 presents this plurality of different remote control instruction signal protocols in an order that matches a sequential order 401 by which the controller 201 will incrementally dynamically configure the dynamically configurable remote control instruction signal transmitter 202 during the described learning mode of operation.

This user discernable listing 402 can comprise, by one approach, alphanumeric characters as shown in FIG. 4. Such text can identify, if desired, specific manufacturer's names and/or specific model numbers of the supported movable barrier operators. By another approach, as used in combination with the above or in lieu thereof, and referring momentarily to FIG. 5, this user discernable listing 402 can comprise graphic content. As illustrated, this graphic content can comprise photographic and/or artist's renderings that depict a plurality of different movable barrier operator remote control transmitters as correspond to various ones of the different remote control instruction signal protocols (where, again, these images are presented in a sequential order that matches the order by which the transmitter 200 will incrementally test for compatible operation during the learning mode of operation).

By one approach, the referred to sequential order 401 can itself be managed and selected in order to support these teachings. In particular, this order can be selectively configured and arranged to tend to prompt reconfiguration of at least one radio frequency transmission parameter of the dynamically configurable remote control instruction signal transmitter to thereby tend to delay the aforementioned test transmission. Such a delay can provide, in turn, an opportunity for the user to quickly assert the user input 203 as described earlier for purposes that will be described and explained below in more detail.

To illustrate this concept, and with continued reference to FIG. 4, a first remote control instruction signal protocol can relate to Model B as offered by a second Manufacturer (where "Manufacturer" is abbreviated in the figure as "MNF"). For the sake of this example, presume that this remote control instruction signal protocol requires use of a first transmission frequency. In this example, Model A as offered by this same second Manufacturer also requires use of this same first transmission frequency. Although it might be useful for some purposes to group both models as are offered by this one manufacturer together in this sequential order, instead, Model B by the second Manufacturer is followed in the sequential order by Model A as offered by a first Manufacturer because, in this illustrative example, this Model A by the first Manufacturer requires use of a second transmission frequency that is different from the first transmission frequency.

As a result, then, a bit more delay can be anticipated when incrementally shifting from a test configuration of the transmitter that utilizes the first transmission frequency to a test configuration of the transmitter that utilizes the second transmission frequency. This delay, in turn, can actually aid with respect to accommodating these teachings as set forth in more detail below.

The form of this user discernable listing 402 can vary according to the needs and/or opportunities as may tend to characterize a given application setting. By one approach, this user discernable listing 402 can comprise a printed document that is provided within, or comprises a part of, the packaging materials for the movable barrier operator remote control transmitter 200. Such a document can be comprised of paper, cardboard, or other stock material of this kind or can be comprised of a more resilient material such as a plastic sheet. By another approach, as used alone or in combination with the above, this user discernable listing 402 can comprise digital data that is stored, for example, in the aforementioned memory 204 and that is selectively displayable on a corresponding display (not shown) that couples, for example, to the controller 201. By yet another approach, this user discernable listing 402 can be stored remotely from the transmitter 200 (for example, at a server that is accessible via a network such as the Internet) and recalled and viewed when needed by the user. Other approaches no doubt exist.

Referring now to FIGS. 1 and 6, this process 100 will also accommodate providing 103 user discernable instructions 601 regarding use of this user discernable listing 402 in conjunction with this movable barrier operator remote control transmitter 200. In particular, these instructions 601 can serve to instruct the user regarding use of the user discernable listing 401 to determine a particular number of times to rapidly assert the user interface during the learning mode of operation to thereby begin the test transmission process with a particular selected entry in the listing. An example set of instructions in this regard could read as follows: "Consult the transmitter listing and identify your likely transmitter. Note the sequence number for that transmitter (shown at the left of the transmitter description). Place the movable barrier operator into the learning mode as described above and quickly press the middle button of the transmitter the noted number of times."

So configured, a user can quickly increment the transmitter 200 through any number of candidate protocols without requiring a complete test transmission for each such candidate protocol in order to begin the test transmissions with a candidate test transmission that is more likely to succeed. Such an approach can aid in assuring, for example, that the movable barrier operator's learning mode does not automatically expire and terminate prior to the transmitter having auto-incremented to the correct protocol. Such an approach also well accommodates a very limited user interface as tends to characterize many or most transmitters of this sort.

As described above, the transmitter 200 will begin to take such steps as are appropriate to effect a given test transmission with each incrementation of the sequential listing of candidate movable barrier operators. Such steps can include both configuring the transmitter in an appropriate manner as well as effecting an actual test transmission 701 such as the one schematically illustrated in FIG. 7. In some cases, and for any number of reasons, it is possible that such a test transmission 701 begins before the user again asserts the user interface 203 in order to advance the count as advised in the aforementioned instructions 601. If desired, the controller 201 can be further configured and arranged to automatically halt 901 such a test transmission 701 (as illustrated in FIG. 9) upon detecting a subsequent user assertion of the user input 203 prior to completion of the test transmission 701. This, in turn, can also lead to some time savings by permitting the transmitter to effectively begin its reconfiguration of the transmitter for a next subsequent candidate protocol before having to wait for a conclusion of the test transmission 701.

Those skilled in the art will understand and appreciate that these teachings are compatible for use in application with an approach to test transmissions that comprises a series of transmissions of each (or at least some) particular remote control instruction signal protocol. To illustrate, and referring now to FIG. 8, a first test transmission 701 as described above can be followed by one or more subsequent test transmissions 801. In some cases, as when the corresponding protocol comprises a fixed code-based protocol, each such repeated transmission 801 can be essentially identical to the first test transmission 701 for that series. In cases where the corresponding protocol comprises a rolling code-based protocol, each repeated transmission 801 can comprise a rolling iteration of a rolling code as corresponds to that particular remote control instruction signal protocol.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A movable barrier operator remote control transmitter kit for use with a movable barrier operator that uses a particular remote control instruction signal protocol, the kit comprising:
a movable barrier operator remote control transmitter comprising:
a dynamically configurable remote control instruction signal transmitter;
a user input;
a memory having stored therein a plurality of different remote control instruction signal protocols as correspond to a plurality of different movable barrier operators; and
a controller operably coupled to the dynamically configurable remote control instruction signal transmitter, the user input, and the memory, and being configured and arranged to:
during a user selectable learning mode of operation:
automatically at least begin to incrementally dynamically configure the dynamically configurable remote control instruction signal transmitter using a next one of the plurality of different remote control instruction signal protocols with each user assertion of the user input to thereby provide a test configured transmitter;
cause the test configured transmitter to transmit a test transmission corresponding to the next one of the plurality of different remote control instruction signal protocols to thereby permit the user to ascertain whether a corresponding movable barrier operator responds positively to the test configured transmitter;
automatically halt the test transmission corresponding to the next one of the plurality of different remote control instruction signal protocols upon detecting a subsequent user assertion of the user input prior to completion of the test transmission.

2. The movable barrier operator remote control transmitter kit of claim 1 wherein the plurality of different movable barrier operators comprise at least fifteen different movable barrier operators.

3. The movable barrier operator remote control transmitter kit of claim 1 wherein the plurality of different movable barrier operators comprise, at least in part, both fixed code and rolling code-based movable barrier operators.

4. The movable barrier operator remote control transmitter kit of claim 1 wherein the memory has remote control instruction signal protocols as comprise fixed code-based protocols stored therein as a first table and remote control instruction signal protocols as comprise rolling code-based protocols stored therein as a second table that is logically discrete from the first table.

5. The movable barrier operator remote control transmitter kit of claim 1 wherein the plurality of different movable barrier operators comprise movable barrier operators as offered by differing manufacturers.

6. The movable barrier operator remote control transmitter kit of claim 1 further comprising:
a user discernable listing of the plurality of different remote control instruction signal protocols.

7. The movable barrier operator remote control transmitter kit of claim 6 wherein the user discernable listing presents the plurality of different remote control instruction signal protocols in an order that matches a sequential order by which the controller will incrementally dynamically configure the dynamically configurable remote control instruction signal transmitter during the learning mode of operation.

8. The movable barrier operator remote control transmitter kit of claim 7 wherein the user discernable listing comprises alphanumeric characters.

9. The movable barrier operator remote control transmitter kit of claim 7 wherein the user discernable listing comprises graphic content.

10. The movable barrier operator remote control transmitter kit of claim 9 wherein the graphic content comprises, at least in part, depictions of a plurality of different movable barrier operator remote control transmitters as correspond to various ones of the different remote control instruction signal protocols.

11. The movable barrier operator remote control transmitter kit of claim 7 further comprising:
user discernable instructions regarding use of the user discernable listing to determine a particular number of times to rapidly assert the user interface during the learning mode of operation to thereby begin the test transmission with a particular selected entry in the listing.

12. The movable barrier operator remote control transmitter kit of claim 7 wherein the sequential order by which the controller will incrementally dynamically configure the dynamically configurable remote control instruction signal transmitter during the learning mode of operation is configured and arranged to tend to prompt reconfiguration of at least one radio frequency transmission parameter of the dynamically configurable remote control instruction signal transmitter to thereby tend to delay the test transmission.

13. The movable barrier operator remote control transmitter kit of claim 1 wherein the test transmission comprises a series of transmissions of the particular remote control instruction signal protocol.

14. The movable barrier operator remote control transmitter kit of claim 13 wherein the series of transmissions comprises, at least in part, a plurality of repeated transmissions of a particular remote control instruction using the particular remote control instruction signal protocol.

15. The movable barrier operator remote control transmitter kit of claim 14 wherein the plurality of repeated transmissions of a particular remote control instruction each comprise an iteration of a rolling code as corresponds to the particular remote control instruction signal protocol.

16. A movable barrier operator remote control transmitter kit for use with a movable barrier operator that uses a particular remote control instruction signal protocol, the kit comprising:
   a movable barrier operator remote control transmitter comprising:
      a dynamically configurable remote control instruction signal transmitter;
      a user input;
      a memory having stored therein a plurality of different remote control instruction signal protocols as correspond to a plurality of different movable barrier operators;
      a controller operably coupled to the dynamically configurable remote control instruction signal transmitter, the user input, and the memory, and being configured and arranged to:
         during a user selectable learning mode of operation:
            automatically at least beginning to incrementally dynamically configure the dynamically configurable remote control instruction signal transmitter using a next one of the plurality of different remote control instruction signal protocols with each user assertion of the user input to thereby provide a test configured transmitter, a given user assertion of the user input halting a previous one of the plurality of different remote control instruction signal protocols prior to completion of a test transmission for the previous one of the plurality of different remote control instruction signal protocols;
            causing the test configured transmitter to transmit a test transmission corresponding to the next one of the plurality of different remote control instruction signal protocols to thereby permit the user to ascertain whether a corresponding movable barrier operator responds positively to the test configured transmitter; and
   a user discernable listing of the plurality of different remote control instruction signal protocols that presents the plurality of different remote control instruction signal protocols in an order that matches a sequential order by which the controller will incrementally dynamically configure the dynamically configurable remote control instruction signal transmitter during the learning mode of operation.

17. The movable barrier operator remote control transmitter kit of claim 16 wherein the plurality of different movable barrier operators comprise at least fifteen different movable barrier operators.

18. The movable barrier operator remote control transmitter kit of claim 16 wherein the plurality of different movable barrier operators comprise, at least in part, both fixed code and rolling code-based movable barrier operators.

19. The movable barrier operator remote control transmitter kit of claim 16 wherein the memory has remote control instruction signal protocols as comprise fixed code-based protocols stored therein as a first table and remote control instruction signal protocols as comprise rolling code-based protocols stored therein as a second table that is logically discrete from the first table.

20. The movable barrier operator remote control transmitter kit of claim 16 wherein the plurality of different movable barrier operators comprise movable barrier operators as offered by differing manufacturers.

21. The movable barrier operator remote control transmitter kit of claim 16 wherein the user discernable listing comprises alphanumeric characters.

22. The movable barrier operator remote control transmitter kit of claim 16 wherein the user discernable listing comprises graphic content.

23. The movable barrier operator remote control transmitter kit of claim 22 wherein the graphic content comprises, at least in part, depictions of a plurality of different movable barrier operator remote control transmitters as correspond to various ones of the different remote control instruction signal protocols.

24. The movable barrier operator remote control transmitter kit of claim 16 further comprising: user discernable instructions regarding use of the user discernable listing to determine a particular number of times to rapidly assert the user interface during the learning mode of operation to thereby begin the test transmission with a particular selected entry in the listing.

25. The movable barrier operator remote control transmitter kit of claim 16 wherein the sequential order by which the controller will incrementally dynamically configure the dynamically configurable remote control instruction signal transmitter during the learning mode of operation is configured and arranged to tend to prompt reconfiguration of at least one radio frequency transmission parameter of the dynamically configurable remote control instruction signal transmitter to thereby tend to delay the test transmission.

26. The movable barrier operator remote control transmitter kit of claim 16 wherein the test transmission comprises a series of transmissions using a same one of the remote control instruction signal protocols.

27. The movable barrier operator remote control transmitter kit of claim 26 wherein the series of transmissions comprises, at least in part, a plurality of repeated transmissions of a particular remote control instruction using the same one of the remote control instruction signal protocols.

28. The movable barrier operator remote control transmitter kit of claim 27 wherein the plurality of repeated transmissions of a particular remote control instruction each comprise an iteration of a rolling code as corresponds to the same one of the remote control instruction signal protocols.

29. A method comprising:
   providing a movable barrier operator remote control transmitter that comprises:

a dynamically configurable remote control instruction signal transmitter;

a user input;

a memory having stored therein a plurality of different remote control instruction signal protocols as correspond to a plurality of different movable barrier operators; and a controller operably coupled to the dynamically configurable remote control instruction signal transmitter, the user input, and the memory, and being configured and arranged to:

during a user selectable learning mode of operation:

automatically at least beginning to incrementally dynamically configure the dynamically configurable remote control instruction signal transmitter using a next one of the plurality of different remote control instruction signal protocols with each user assertion of the user input to thereby provide a test configured transmitter, a given user assertion of the user input halting a previous one of the plurality of different remote control instruction signal protocols prior to completion of a test transmission for the previous one of the plurality of different remote control instruction signal protocols;

causing the test configured transmitter to transmit a test transmission corresponding to the next one of the plurality of different remote control instruction signal protocols to thereby permit the user to ascertain whether a corresponding movable barrier operator responds positively to the test configured transmitter to thereby permit the user to ascertain whether a corresponding movable barrier operator responds positively to the test configured transmitter;

providing a user discernable listing of the plurality of different remote control instruction signal protocols that presents the plurality of different remote control instruction signal protocols in an order that matches a sequential order by which the controller will incrementally dynamically configure the dynamically configurable remote control instruction signal transmitter during the learning mode of operation.

30. A method comprising:

entering a learn mode for a dynamically configurable remote control instruction signal transmitter to determine a remote control instruction signal protocol suitable for effecting operation of a movable barrier operator;

at least beginning to dynamically configure the dynamically configurable remote control instruction signal transmitter using one of a plurality of different remote control instruction signal protocols;

receive a user assertion at a user input in operative communication with the dynamically configurable remote control instruction signal transmitter prior to completion of a test transmission corresponding to the one of a plurality of different remote control instruction signal protocols;

in response to receiving the user assertion at the user input:

halting the completion of the test transmission corresponding to the one of a plurality of different remote control instruction signal protocols, and at least beginning to incrementally dynamically configure the dynamically configurable remote control instruction signal transmitter using a next one of the plurality of different remote control instruction signal protocols.

* * * * *